July 15, 1958  C. H. WHITTEN  2,842,857
APPARATUS FOR PATTERN DEVELOPMENT
Filed Nov. 8, 1955 2 Sheets-Sheet 1

Charles H. Whitten
INVENTOR.

July 15, 1958  C. H. WHITTEN  2,842,857
APPARATUS FOR PATTERN DEVELOPMENT
Filed Nov. 8, 1955  2 Sheets-Sheet 2
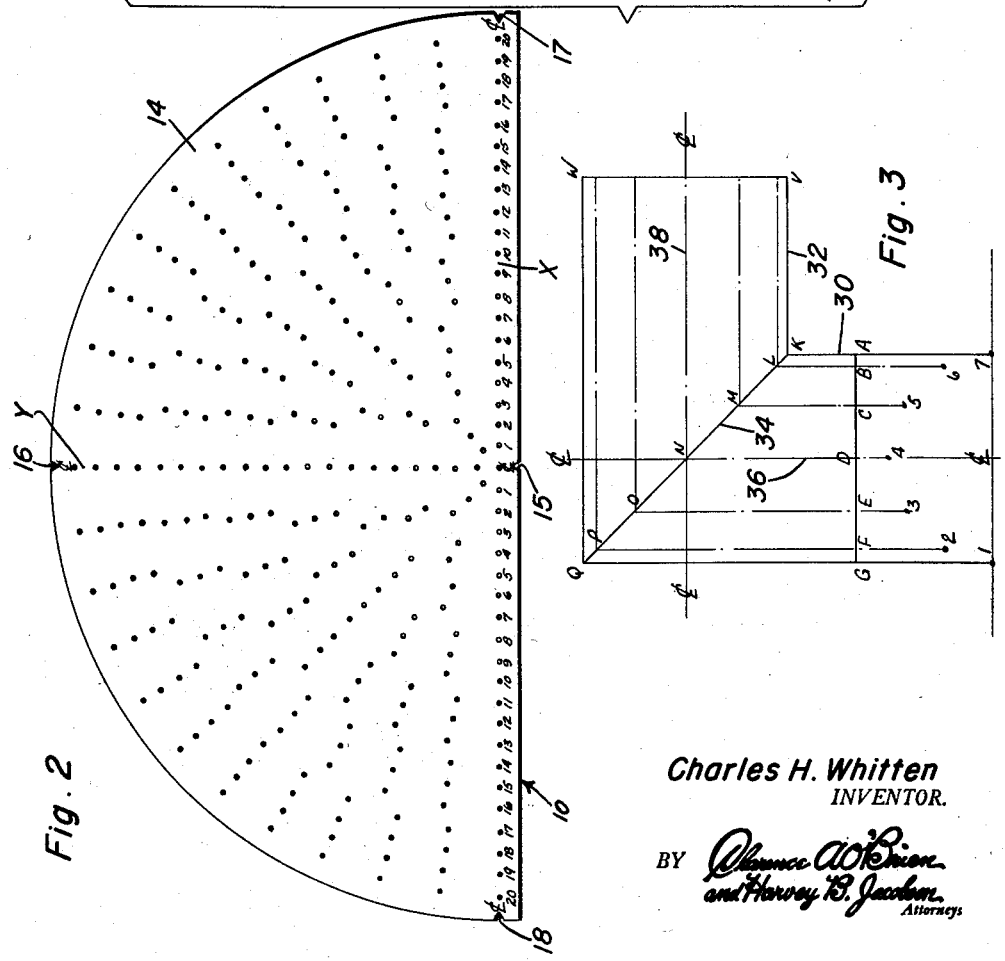
Charles H. Whitten
INVENTOR.

United States Patent Office 2,842,857
Patented July 15, 1958

2,842,857

APPARATUS FOR PATTERN DEVELOPMENT

Charles H. Whitten, Baton Rouge, La., assignor of fifty percent to Fabio G. Halphen, Jr., Port Allen, La.

Application November 8, 1955, Serial No. 545,615

5 Claims. (Cl. 33—174)

This invention relates to apparatus for facilitating the laying out of patterns that are adapted to indicate lines of cutting upon cylindrical objects which are to be joined at an angle to each other.

An object of this invention is to provide a very inexpensive aid for laying out patterns which are usable in cutting cylindrical objects at the proper angle for joining to other cylindrical objects, the apparatus which constitutes the aid, consisting of two indexing scales having patterns of openings thereon which are interrelated with each other.

A more specific object of the invention is to provide an apparatus for facilitating the laying out of patterns for the purposes specified previously, the apparatus including a first indexing scale which has a number of rows of apertures, each row being semi-circular with the end openings of each row lying in a single X-axis plane while the central aperture of each row lies on a line which is normal to the X-axis.

A further object of the invention is to provide a second indexing scale usable with the first indexing scale, the second indexing scale having a number of series of openings in it, the openings of each series preferably being designated by radius for diameter indications, the end openings of each row being spaced apart the distance which is identical to the circumference of the circle whose diameter is marked at the end thereof, there being on the first indexing scale diameter designations for identifying the semi-circular rows of apertures with the longitudinal series of apertures.

A further object of the invention is to provide an assembly of scales as described in which constant reference to tables relating to circles and circumferences, as normally the case in laying out patterns for cutting cylindrical objects that are to be subsequently joined, is completely avoided.

Another object of the invention is to provide indexing scales as described previously wherein some of the apertures may be used for making on the pattern perfectly spaced points which may be drilled or otherwise opened in order to accommodate rivets, bolts, screws or other fastening means.

These together with other objects and advantages which will become subsequently apparent reside in the details of construction and operation as more fully hereinafter described and claimed, references being had to the accompanying drawings forming a part hereof, wherein like numerals refer to like parts throughout, and in which:

Figure 2 is a plan view of the first indexing scale;

Figure 3 is a schematic view showing a right angle elbow formed with a pattern made in accordance with the principles of the invention applied thereon and showing the use of the first scales of Figure 2 in connection therewith; and Figure 4 is a plan view of patterns which are formed on sheet material in accordance with the principles of the invention.

Figure 1:
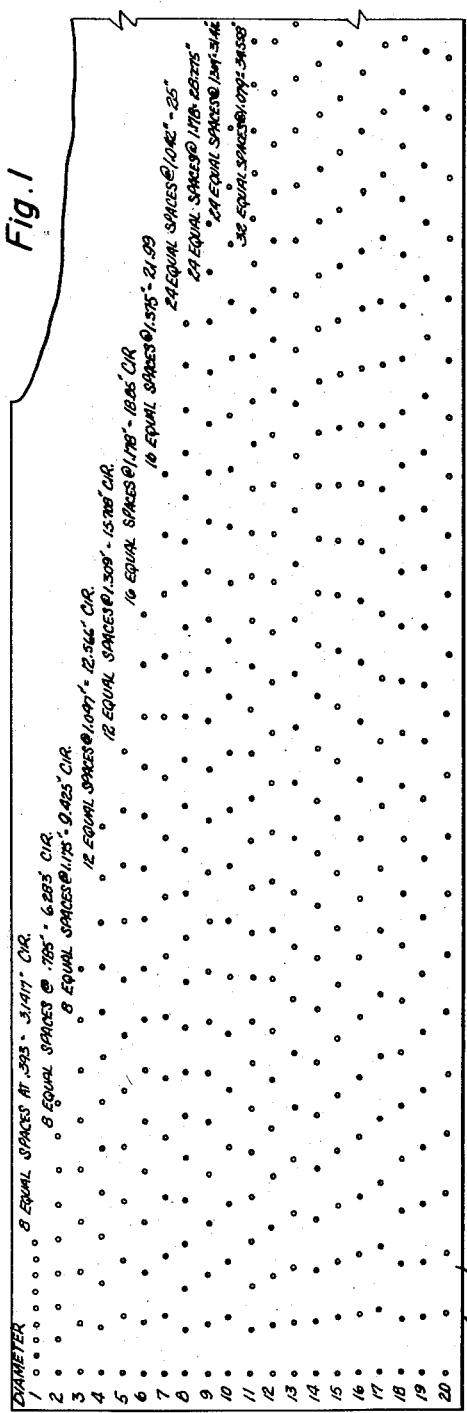
Figure 1 is a broken plan view of the second indexing scale.
Figure 1:
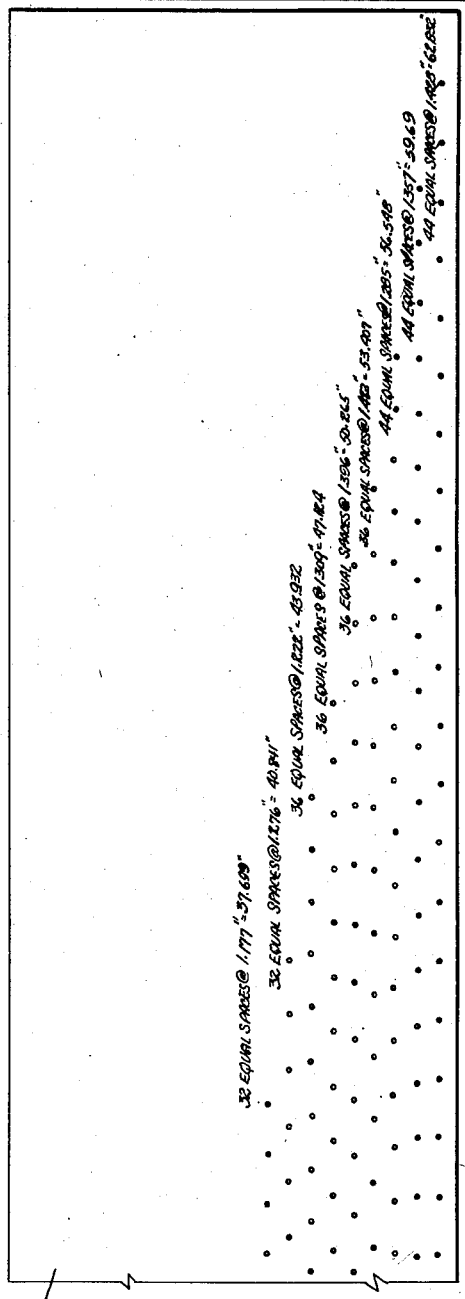

There are two indexing scales, the first indexing scale 10 and the second indexing scale 12 being made of light weight material. Indexing scale 10 consists preferably of a semi-circular panel 14 having a number of semi-circular rows of apertures designated at both ends by the numbers 1 through 20. These numbers indicate the diameter of the semi-circle whose end apertures terminate thereadjacent. Each row of apertures is made of a number of apertures that are equally spaced, and the end apertures of each row being arranged in a line which is designated as the X-axis. The center aperture of each row falls in a line normal to the X-axis and may be designated as the Y-axis. Notches 15 and 16 are formed in the panel 14 at the ends of the Y-axis. Notches 17 and 18 are formed in the panel at the ends of the X-axis.

The second indexing scale 12 consists of a flat member 20 having a number of parallel series of apertures formed in it. The radius or diameter, preferably the latter, of a circle whose circumference is equal to the distance between the first and last aperture of each row, is indicated numerically. Accordingly, for the one inch diameter circle the circumference of it will be 3.1417 inches. The series of apertures in the member 12 corresponding to such a circle consists of eight apertures spaced at .393 inch thereby including a length of 3.1417 inches. For each of the other series of apertures in member 12 a similar structural arrangement prevails.

In Figure 3 there is the outline of an elbow formed by joining cylinders 30 and 32 at right angles to each other, the junction being designated by the line 34 of intersection. Although the cylindrical stock may be joined at various angles in order to demonstrate the mode of operation of the indexing scales 12 and 10, a 90 degree elbow has been selected.

In making a pattern for cutting the ends of the cylindrical stock so that they may be joined along a straight line, the center lines 36 and 38 are first laid out at right angles to each other. Indexing scale 10 is placed on the sheet material that is to become the pattern with the Y-axis coinciding with one of the axes for example axis 36, and the X-axis of indexing scale 10 parallel to axis 38. A proper row of apertures is selected on the indexing scale 10. This row will have the same diameter designation as the diameter of the stock which is to be joined. For example, if the pieces of stock 30 and 32 are to be four inches in diameter the row designated by the numeral 4 on scale 10 will be selected. Thereafter all of the holes in that row are used in applying marks to the sheet of material, these marks being made by a prick punch or pencil or some other type of standard indicator. After the marks are made as at 1 through 4, inclusive in Figure 3, vertical lines normal to the X-axis or the axis 38 are drawn therefrom to the line of intersection 34. The points K, L, M, N, O, P and Q are points on the parallel lines designating the curve of intersection. The line A—G is arbitrarily placed in a vertical plane, that is, along the lines which are drawn parallel to each other and which rise from the numerals 1 through 7, inclusive, of Figure 3. If the line A—G is drawn close to the line of intersection, the resulting pattern will be short. However, if it is spaced considerably from it the resulting pattern will be long. The points of intersection of the parallel lines and the line A—G are designated at A, B, C, D, E, F and G, respectively.

Now the second indexing scale 12 is used. The scale 12 is placed on the sheet of pattern forming material. Inasmuch as a 4-inch diameter piece of stock is being used, the series of apertures provided specially for a 4- inch diameter stock is used. It has twelve equally spaced apertures at 1.047 inches on centers which include a space of 12.566 inches between the first and the last aperture of this series. The latter sum is the circumference of a circle whose diameter is four inches.

Each of these apertures in the series discussed above is used to accommodate a prick punch, pencil or the like in order to mark points A, B, C, D, E, F, G, F', E', D', C', B' and A' from which parallel lines are drawn. Then, transposing the distances from Figure 3, the parallel lines A—K, B—L, C—M, D—N, E—O, F—P and G—Q are laid out on the parallel lines of Figure 4. The remainder of the parallel lines in Figure 4 are duplications in length of those previously mentioned. The points K, L, M, N, O, P, Q, P', O', N', M', L', and K' define a curve 40 when struck therethrough which is the cut line in order to form the line of intersection 34. Accordingly, the lines 34 and 40 will be identical. In order to find the other pattern, that is, the pattern for the piece of stock 32, the same procedure is followed in order to define pattern TUVW.

For sheet metal work, the pattern may be traced directly on the stock. This is a distinct advantage in that both the pieces of stock 30 and 32 may be cut from a single square piece of sheet metal without any waste material. In this regard consider that the two patterns A, A', K', and K together with T, U, V and W are moved together so that the line 40 coincides with line 41. Then, both of the pieces of stock 30 and 32 may be formed by a single cut taken in the square piece of metal which represents the pattern in Figure 4.

The pattern shown in Figure 4 fails to provide for the lap by which two branches 30 and 32 are held together. A lap of any desired width may be added to the pattern after it is constructed by drawing an additional curve parallel to the curve 40, the distance between the two curves being equal to the width of the desired lap. Moreover, the pattern may be formed with markings used to locate holes for attachment of the elbow to any other section by simply scribing markings along any of the parallel lines in Figure 4. This will yield perfectly aligned openings to receive fastening devices such as screws, rivets or bolts. It is fully apparent that 20 diameters have been selected to illustrate the principles of the invention in both of the scales. However, a larger or smaller number of diameters may be selected as found desirable.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an assembly for the parallel line development of sheet forms, a first indexing scale consisting of a panel having rows of apertures therein, each row being arranged in an arc of a circle, the apertures at the ends of each row being located in an X-axis line, the center aperture of each of said rows being aligned in a Y-axis line normal to said X-axis line, indicating means at the ends of said X and Y axis lines, a second indexing scale comprising a flat member having a plurality of series of spaced openings, each series consisting of a plurality of openings that are equally spaced with the distance between the first and the last opening being equal to the circumference of a circle whose diameter or radius is indicated at one end thereof and on said flat member.

2. For use in developing sheet patterns for cutting a piece of cylindrical stock which is adapted to be joined with its axis at an angle to the axis of another piece of similar diameter stock, a first indexing scale from which to form on a sheet a plurality of marks which are equally spaced in a semi-circle whose diameter is equal to the diameter of said cylindrical stock and from which marks a plurality of construction lines parallel to the first mentioned axis and at an angle to the second mentioned axis may be drawn to the curve of intersection of said axes and said pieces of cylindrical stock, a second indexing scale for forming on the sheet a number of marks which are similar in number to said plurality of construction lines and which are spaced equally, the distance between the end marks being equal to the circumference of said cylindrical stock so that said parallel lines may be transposed in expanded form on the last-mentioned sheet and having their ends on the last-mentioned marks, and the opposite ends of said parallel lines defining the curve along which one of said pieces of cylindrical stock is to be cut.

3. The combination of claim 2 wherein said first indexing scale comprises a panel in which there are a plurality of semi-circular rows of apertures, and the apertures in each row being equally spaced, the end apertures of each row being in longitudinal alignment.

4. The combination of claim 3 wherein said second indexing scale comprises a flat member having series of equally spaced openings, the distance between the first and last opening of each series being equal to the circumference of a circle whose diameter is indicated.

5. The combination of claim 2 wherein said first indexing scale comprises a panel in which there are a plurality of semi-circular rows of apertures, and the apertures in each row being equally spaced, the end apertures of each row being in longitudinal alignment and said second indexing scale includes a flat member having a series of equally spaced openings, the distance between the first and last opening of each series being equal to the circumference of a circle whose diameter is indicated, there being for each series of openings a corresponding semi-circular row of said apertures whose diameter is similar to the diameter of a circle that is defined by one of the circumference lengths of one of said series of apertures.

References Cited in the file of this patent

UNITED STATES PATENTS

| 679,261 | Johnson | July 23, 1901 |
| 1,693,227 | Ellis | Nov. 27, 1928 |
| 2,547,745 | Cade | Apr. 3, 1951 |
| 2,653,387 | Cameron | Sept. 29, 1953 |

FOREIGN PATENTS

| 14,712 | Great Britain | 1908 |
| 564,645 | Great Britain | Oct. 6, 1944 |

OTHER REFERENCES

Blinn: Tin Sheet—Iron and Copper—Plate Worker, pages 77–79, Baird and Co. Inc., N. Y. C., 1920, Sci. Lib., TS 250 B6.